United States Patent [19]

Tanaka et al.

[11] 4,413,102
[45] Nov. 1, 1983

[54] COMPOSITION FOR PROTECTING CEMENTWARE FROM FROST-DAMAGE COMPRISING URETHANE RESIN AND ORGANOPOLYSILOXANE

[75] Inventors: Michio Tanaka, Takatsuki; Kohji Nasu; Tetsuaki Kanemoto, both of Nishinomiya, all of Japan

[73] Assignee: Takeda Chemical Industries, Ltd., Osaka, Japan

[21] Appl. No.: 344,080

[22] Filed: Jan. 28, 1982

Related U.S. Application Data

[62] Division of Ser. No. 133,291, Mar. 24, 1980, Pat. No. 4,330,595.

[30] Foreign Application Priority Data

Mar. 26, 1979 [JP] Japan .................................. 54-35791

[51] Int. Cl.³ .............................................. C08L 75/04
[52] U.S. Cl. .................................... 525/453; 525/440; 525/474
[58] Field of Search ......................... 525/453, 474, 440

[56] References Cited

U.S. PATENT DOCUMENTS 2,924,587  2/1960  Shorr .............................. 428/425.5
3,536,655  10/1970 Burrill ................................. 525/474
3,742,084  6/1973  Olyphant et al. ..................... 525/453
4,265,801  5/1981  Moody et al. ........................ 525/453

FOREIGN PATENT DOCUMENTS 528489   7/1956  Canada ............................... 525/474
47-13189 4/1972  Japan .
48-9091  3/1973  Japan .

Primary Examiner—Wilbert J. Briggs, Sr.
Attorney, Agent, or Firm—Wenderoth, Lind & Ponack

[57] ABSTRACT

A method of protecting cementware from frost-damage, which comprises coating the cementware with a moisture-cure type urethane resin coating impregnated with a web-like or three-dimensionally structured organopolysiloxane compound represented by the rational formula:

$R_2Si_2O_3$ wherein R is alkyl, hydroxyalkyl, aryl or aralkyl, of about 0.5 to 50 parts by weight relative to 100 parts by weight of resin portion in the urethane resin coating, and a composition therefor.

The cementware applied with the composition has an excellent water repellency and an improved protective effect from frost-damage.

7 Claims, No Drawings

COMPOSITION FOR PROTECTING CEMENTWARE FROM FROST-DAMAGE COMPRISING URETHANE RESIN AND ORGANOPOLYSILOXANE

This application is a division of application Ser. No. 133,291, filed Mar. 24, 1980 (now U.S. Pat. No. 4,330,595).

This invention relates to a method for protecting cementware from frost-damage, and to a composition therefor.

Cementware is nowadays one of the important materials of construction. In cold climates, however, cement structures are often found to suffer various kinds of damage caused by cold climatic conditions, such as considerable loss of durability and failure to achieve desired strength. This is what is called "frost-damage", and is mainly caused by destruction of cementware due to freezing of water contained in the cementware.

Water, upon freezing, expands in volume by about 9%, and an extremely high pressure is required for complete prevention of water from freezing, so that cementware with its strength alone fails to resist such a pressure. So as to prevent water from freezing at $-10°$ C., for example, a pressure in excess of 1,000 kg/cm$^2$ is necessary, and it is impossible to prevent water contained in the cementware from freezing by a tensile strength of no more than about 50 kg/cm$^2$ of the cementware. In addition, cementware is capable of only slight elongation and it is impossible for it to elastically deform corresponding to its 9% volume expansion, thus being susceptible to ready disintegration through freezing of the moisture in the cementware.

In protecting cementware from frost-damage, therefore, it is imperative to prevent water from penetrating into cementware.

With a specific view to protection of cementware from frost-damage, considerable investigation has been so far undertaken on a great variety of resins, such as polyvinyl chloride, vinyl resins, polyurethanes, acrylics, epoxy resins, alkyds, amino resins and the like. Among these resins, polyurethane coatings have turned out to provide the effect relatively good but not yet complete. On the other hand, various types of water repellents have also been under evaluation for the protection of cementware from frost-damage but, due to lack of durability, no perfect product has yet been available.

In view of these circumstances, the present inventors, after a great deal of extensive research and investigation, found out that a web-like or three-dimensionally structured organopolysiloxane compound represented by a particular rational formula in the particular proportion against the resin portion in said coating, when it is applied on the surface of cementware, can completely protect such cementware from frost-damage. The finding was followed by further research which has resulted in this invention.

This invention is therefore directed in one aspect, to (1) a method of protecting cementware from frost-damage, which comprises coating the cementware with a moisture-cure type urethane resin coating impregnated with a web-like or three-dimensionally structured organopolysiloxane compound represented by the rational formula:

$R_2Si_2O_3$ wherein R is alkyl, hydroxyalkyl, aryl or aralkyl, of about 0.5 to 50 parts by weight relative to 100 parts by weight of resin portion in the urethane resin coating and, in the other aspect, to (2) a composition for protecting cementware from frost-damage, which comprises a moisture-cure type urethane resin coating and a web-like or three-dimensionally structured organopolysiloxane compound represented by the rational formula:

$R_2Si_2O_3$ wherein R is alkyl, hydroxyalkyl, aryl or aralkyl, of about 0.5 to 50 parts by weight relative to 100 parts by weight of resin portion in the urethane resin coating.

The urethane resin coating, which is usable in this invention, is the one-can type. One-can type urethane resin coatings, being the so-called moisture-cure ones, are composed of urethane prepolymers having isocyanate groups at the terminals, and are curable by reaction with the moisture in the air after being applied.

The moisture-cure type urethane resin coatings are obtained by reacting an excess amount of a polyisocyanate with a polyol component, preferably in an NCO/OH ratio of about 1.1 to about 2.0.

As examples of the polyisocyanate, there may be mentioned aliphatic diisocyanates such as trimethylenediisocyanate, tetramethylenediisocyanate, hexamethylenediisocyanate, pentamethylenediisocyanate, 1,2-propylenediisocyanate, 1,2-butylenediisocyanate, 2,3-butylenediisocyanate, 1,3-butylenediisocyanate, 2,4,4- or 2,2,4-trimethylhexamethylenediisocyanate 2,6-diisocyanatomethylcaproate; cycloalkylenediisocyanates such as 1,3-cyclopentanediisocyanate, 1,4-cyclohexanediisocyanate, 1,3-cyclohexanediisocyanate, 3-isocyanatomethyl-3,5,5-trimethylcyclohexylisocyanate, 4,4'-methylenebis(cyclohexylisocyanate), methyl-2,4-cyclohexanediisocyanate, methyl-2,6-cyclohexanediisocyanate, 1,4-bis(isocyanatomethyl)cyclohexane and 1,3-bis(isocyanatomethyl)cyclohexane; aromatic diisocyanates such as m-phenylenediisocyanate, p-phenylenediisocyanate, 4,4'-diphenyldiisocyanate, 1,5-naphthalenediisocyanate, 4,4'-diphenylmethanediisocyanate, 2,4- or 2,6-tolylenediisocyanate or their mixture, 4,4'-toluidinediisocyanate, dianisidinediisocyanate and 4,4'-diphenyl ether diisocyanate, aromatic-aliphatic diisocyanates such as 1,3- or 1,4-xylylene diisocyanate, or their mixture, $\omega,\omega''$-diisocyanate-1,4-diethylbenzene, etc.; triisocyanates such as triphenylmethane-4,4',4''-triisocynate, 1,3,5-triisocyanatebenzene and 2,4,6-triisocyanatetoluene; tetraisocyanates such as 4,4'-diphenyldimethylmethane-2,2'-5,5'-tetraisocyanate; polymerized polyisocyanates such as tolylenediisocyanate dimer and trimer; and polyphenylpolymethylenepolyisocyanate, etc. These may be used alone or as a mixture of two or more of them.

From the standpoint of the performance to be realized, preferred are tolylenediisocynate, 4,4'-diphenylmethanediisocyanate, xylylenediisocyanate, 4,4'-methylene-bis(cyclohexylisocynate), bis(isocyanatomethyl)cyclohexane, 3-isocyanatomethyl-3,5,5-trimethylcyclohexylisocyanate, and hexamethylenediisocyanate. Particularly preferable among others are bis(isocyanatomethyl)cyclohexane, xylylenediisocyanate, and 3-isocyanatomethyl-3,5,5-trimethylcyclohexylisocyanate.

Examples of the polyol which is usable in this invention for the production of the moisture-cure type urethane resin coatings include glycols such as ethylene glycol, 1,2-propylene glycol, 1,3-propylene glycol, 1,3-butylene glycol, 1,4-butylene glycol, 2,3-butylene glycol, 1,6-hexanediol, neopentyl glycol, 1,4-cyclohexanediol, 1,4-cyclohexanedimethanol, hydrogenated bisphenol A, diethylene glycol, triethylene glycol, dipropylene glycol, tripropylene glycol, 1,3-xylyleneglycol, 1,4-xylyleneglycol, 1,5-pentanediol, 2,4,4-trimethyl-1,3-pentanediol, etc.; low molecular weight polyols such as glycerol, trimethylol propane, trimethylol ethane, 1,2,6-hexanetriol, pentaerythritol and sorbitol; polyether polyols such as polyoxyethylene polyol, polyoxypropylene polyol and polyoxytetramethylene ether glycol; polyester polyols, and their oil-modified products, as being obtained by reacting the glycols and low molecular weight polyols mentioned above with acids such as adipic acid, phthalic acid, maleic acid, fumaric acid, succinic acid, sebacic acid, terephthalic acid, isophthalic acid and trimellitic acid; and, acrylic polyols, castor oil, epoxy compounds and their modified products.

The reaction between a polyisocyanate and a polyol component, which may be carried out without any solvent, is normally conducted in a solvent having no active hydrogen, such as ethyl acetate, butyl acetate, toluene, xylene, 2-ethoxyethyl acetate, methyl ethyl ketone, methyl isobutyl ketone, tetrahydrofurane and dioxane.

The reaction temperature is within the range of about 10° to 150° C., preferably within the range of about 40° to 90° C. In case the reaction is slow, there may be added a conventional catalyst capable of accelerating the urethane reaction (e.g., metal compounds, organometallic compounds, organic amine compounds, etc.).

The moisture-cure type urethane resin coating obtained by the above procedure is normally in the form of a polyisocyanate solution having a solid content of about 10 to 75 weight % and an isocyanate content of 1 to 10 weight %.

The organopolysiloxane compound which is utilized in conjunction with the urethane resin coating in this invention is web-like or three-dimensionally structured and represented by the following rational formula:

$$R_2Si_2O_3$$

wherein R is a straight-chain or branched alkyl (e.g., methyle, ethyl, n-propyl, isopropyl, n-butyl, isobutyl, t-butyl, n-amyl, isoamyl, n-hexyl, 2-ethylhexyl, n-nonyl, n-decyl, lauryl, myristyl, cetyl, stearyl, etc.), hydroxyalkyl (e.g. hydroxymethyl, hydroxyethyl, hydroxypropyl, etc.), aryl (e.g. phenyl, tolyl, etc.) or aralkyl (e.g. benzyl, phenethyl etc.).

Preferred in the aspect of alkali resistance are higher alkylpolysiloxane compounds wherein R is an alkyl having not less than 4 carbon atoms or hydroxyalkylpolysiloxane compounds.

The composition for protecting cementware from frost-damage is obtained simply by mixing the moisture-cure type urethane resin coating with the organopolysiloxane compound.

The mixing ratio of the urethane resin coating to the organopolysiloxane compound is from about 0.5 to 50 parts by weight of the organopolysiloxane compound, preferably from about 1 to 5 parts by weight, for every 100 parts by weight of resin portion in the said coating. Outside the range described above, no satisfactory effect of protection from frost-damage is observed.

The concentration of solids in the composition varies depending upon the density, porosity, etc. of a substrate, and is normally in the range of from about 1 to 40 weight %, preferably in the range of from about 5 to 20 weight %.

The composition of this invention, in addition to the urethane resin coating and organopolysiloxane compound, may be incorporated with ancillary materials conventionally employed in the field of urethane resin coatings, such as filler, leveling agent, anti-skinning agent, adherence-improving agent, drying-rate-regulator, flatting agent, coloring agent and the like.

The composition for protecting from frost-damage obtained in this manner is applied on cementware, for example, by use of brush, roller brush, spray gun, flow coater, roll coater, etc. or by dipping.

As examples of the cementware, there may be mentioned concretes, mortars and products made from them such as concrete tunnel structure, concrete tank, concrete building, architectural stone, concrete block, lightweight structures, terrazzo, concrete pipe and asbestos-cement products.

The amount of the composition to be applied to the cementware is within the range of from about 100 g/m² to about 2,000 g/m².

The cementware applied with the composition of this invention is aged for about one week to 10 days at a temperature of from about 0° C. to 40° C.

According to this invention, cementware applied with the composition of this invention has an excellent water repellency and an improved protective effect from frost-damage.

Working examples of this invention will be described below to illustrate specifically this invention, wherein parts or % are on the weight basis.

EXAMPLE 1

Admixed with 1 part of an organopolysiloxane compound (2-ethyl-hexylpolysiloxane) is 1000 parts of the moisture-cure type urethane resin coating with 10% of a solid content obtained by reacting 600 parts of 1,3-bis-(isocyanatomethyl)cyclohexane with 134 parts of trimethylol propane and 1000 parts of polyoxypropylene glycol having a molecular weight of 1000.

52.5 g (400 g/m²) of the previously prepared composition is applied with a brush on a square pillar of concrete measuring 75 by 75 by 400 mm and having specific gravity of 2.5 and compressive strength of 500 kg/cm². Applied with a brush in the same manner is 52.5 g of the above-mentioned urethane resin coating solely.

Furthermore, the organopolysiloxane compound described above is diluted with ethyl acetate to 10% of a solid content and 52.5 g of the resultant solution, solely, is applied with a brush on a square pillar of concrete. The square pillars of concrete applied with various coatings are aged at room temperature for one week, and subjected to a test for resistance of concrete in water to rapid freezing and thawing (ASTMCC666-75) in which the temperature in the center of concrete is allowed to fluctuate repeatedly between −18° C. and +5° C. The results of the 500-cycle repeated test are as follows:

| Test specimen | Appearance | Weight retention, % |
|---|---|---|
| Non-treated | Marked cracking due to frost-damage; badly broken | 71 |

-continued

| Test specimen | Appearance | Weight retention, % |
|---|---|---|
| Organopolysiloxane compound alone applied | off on the surface, especially, edges. Broken off on edges | 83 |
| Urethane resin coating alone | Broken off on edges | 85 |
| The composition of this invention applied | No change detected | 99 |

EXAMPLE 2

The same, three kinds of coatings as in Example 1 are applied at an application rate of 1000 g/m² on the whole surfaces of square pillars of lightweight concrete having specific gravity of 0.5 and measuring 10 10 by 40 cm. These pillars are aged for one week and subjected to the same test as in Example 1. The results of the 30-cycle repeated test are as follows:

| Test specimen | Appearance | Weight retention, % |
|---|---|---|
| Non-treated | Broken in the 10th cycle | — |
| Organopolysiloxane compound alone applied | Broken off on edges | 69 |
| Urethane resin coating alone applied | Broken off partly on edges | 78 |
| The composition of this invention applied | No change detected | 94 |

EXAMPLE 3

Admixed with 5 parts of an organopolysiloxane compound (stearylpolysiloxane) is 1000 parts of the moisture-cure type urethane resin coating with 10% of a solid content obtained by reacting 294 parts of polyphenylpolymethylene-polyisocyanate with 196 parts of castor oil and 35 parts of polyoxypropylene glycol having a molecular weight of 1000 in 525 parts of xylene and diluting the reaction mixture with a solid content of 50% and with an isocyanate content of 6.0% with a mixed solvent of ethylacetate and 2-ethoxyethyl acetate in a weight ratio of 1 to 1.

The previously prepared composition is applied at an application rate of 300 g/m² on a square pillar of concrete measuring 75 by 75 by 400 mm and having compressive strength of 200 kg/cm².

The square pillar is aged at ambient temperature for one week and subjected to the same test as in Example 1. The results of the 500-cycle repeated test are as follows:

| Test specimen | Appearance | Weight retention, % |
|---|---|---|
| Non-treated | Marked cracking due to frost-damage; badly broken off on the surface, especially, edges. | 65 |
| The composition of this invention applied | No change detected | 99 |

EXAMPLE 4

Admixed with 3 parts of an organopolysiloxane compound hydroxyethylpolysiloxane) is 1000 parts of the moisture-cure type urethane resin coating with 10% of a solid content obtained by reacting 941 parts of xylylene diisocyanate with 268 parts of trimethylol propane and 1,000 parts of polybutylene adipate having a molecular weight of 1,000 in 1,105 parts of 2-ethoxyethyl acetate and diluting the reaction mixture with a solid content of 50% and with an isocyanate content of 3.8% with a mixed solvent of ethyl acetate and 2-ethoxyethyl acetate in a weight ratio of 1 to 1.

The previously prepared composition is applied at an application rate of 1,000 g/m² on a column of light weight concrete (8.5 cm diameter and 5.3 cm in height) having specific gravity of 0.4.

The column is aged at ambient temperature for one week and subjected to the same test as in Example 1. The results of the 100-cycle repeated test are as follows:

| Test specimen | Appearance | Weight retention, % |
|---|---|---|
| Non-treated | Broken in the 10th cycle | — |
| The composition of this invention applied | No change detected | 95 |

COMPARATIVE EXAMPLE 1

Admixed with 58.1 parts of an adduct of tolylenediisocyanate with trimethylol propane as a polyisocyanate (an ethyl acetate solution with a solid content of 75% and with an isocyanate content of 12.9%) and 870 parts of ethyl acetate is 70.5 parts of a polyester polyol (a butyl acetate solution with a solid content of 80%, hydroxyl number of 140 and acid value of 4.0) obtained by condensating 1 mole of castor oil, 2 moles of phthalic acid and 1 mole of adipic acid with 3 moles of trimethylol propane, and a two-can type urethane resin coating with a solid content of 10% is prepared. The coating is admixed with 5 parts of an organopolysiloxane compound (stearylpolysiloxane) and applied at an application rate of 300 g/m² on a square pillar of concrete as in Example 3.

The square pillar of concrete is aged at ambient temperature for one week and subjected to the same test with 500 cycles as in Example 1. The results, are as follows:

| Test specimen | Appearance | Weight retention, % |
|---|---|---|
| Non-treated | Marked cracking due to frost-damage; badly broken off on the surfaces, especially edges. | 65 |
| The composition of this Comparative Example applied | Broken off partly on edges | 91 |

COMPARATIVE EXAMPLE 2

Admixed with 61.9 parts of an adduct of xylylene diisocyanate with trimethylolpropane as a polyisocyanate (an ethyl acetate solution with a solid content of 75% and with an isocyanate content of 11.4%) and 871.3 parts of a mixed solvent of ethyl acetate and 2-ethoxyethyl acetate in a weight ratio of 1 to 1 is 67.0 parts of a polyester polyol as used in comparative Example 1, and a two-can type urethane resin coating with a solid content of 10% is prepared.

The coating is admixed with 3 parts of an organopolysiloxane compound (hydroxyethylpolysiloxane) and applied at an application rate of 1000 g/m² on a column of lightweight concrete as used in Example 4.

The column is aged at ambient temperature for one week and subjected to the same test as in Example 1. The results of the 100-cycle repeated test are as follows:

| Test specimen | Appearance | Weight retention, % |
|---|---|---|
| Non-treated | Broken in the 10th cycle | — |
| The composition of this Comparative Example applied | Broken off partly on edges | 78 |

What is claimed is:

1. A composition for protecting cementware from frost-damage, which comprises a moisture-cure type urethane resin coating and a web-like or three-dimensionally structured organopolysiloxane compound represented by the rational formula $$R_2Si_2O_3$$

wherein R is alkyl of not less than 4 carbon atoms or hydroxyalkyl of about 0.5 to 50 parts by weight relative to 100 parts by weight of resin portion in the urethane resin coating.

2. A composition as claimed in claim 1, wherein the organopolysiloxane compound is one represented by the rational formula, $R_2Si_2O_3$ wherein R is alkyl of not less than 4 carbon atoms.

3. A composition as claimed in claim 1, wherein the organopolysiloxane compound is one represented by the rational formula, $R_2Si_2O_3$ wherein F is hydroxyalkyl.

4. A composition as claimed in claim 1, wherein the ratio of the organopolysiloxane compound relative to the urethane resin coating is about 1 to 5 parts by weight relative to 100 parts by weight of resin portion in the urethane resin coating.

5. A composition as claimed in claim 2, wherein the alkyl is 2-ethylhexyl.

6. A composition as claimed in claim 2, wherein the alkyl is stearyl.

7. A composition as claimed in claim 3, wherein the hydroxalkyl is hydroxyethyl.

* * * * *